B. STECHBART.
FILM REELING MECHANISM.
APPLICATION FILED FEB. 5, 1918.

1,287,501.

Patented Dec. 10, 1918.

Witness:
John Enders

Inventor:
Bruno Stechbart,
by Robert Burns.
Atty.

UNITED STATES PATENT OFFICE.

BRUNO STECHBART, OF CHICAGO, ILLINOIS, ASSIGNOR, BY MESNE ASSIGNMENTS, TO AMERICAN PROJECTING COMPANY, OF CHICAGO, ILLINOIS, A CORPORATION OF DELAWARE.

FILM-REELING MECHANISM.

1,287,501. Specification of Letters Patent. Patented Dec. 10, 1918.

Original application filed May 7, 1917, Serial No. 166,866. Divided and this application filed February 5, 1918. Serial No. 215,449.

*To all whom it may concern:*

Be it known that I, BRUNO STECHBART, a citizen of the United States of America, and a resident of Chicago, in the county of Cook, State of Illinois, have invented certain new and useful Improvements in Film-Reeling Mechanism, of which the following is a specification.

This invention relates to that class of film reeling mechanisms for motion picture machines described in detail in my prior application for Letters Patent, Serial No. 166,866, filed May 7, 1917, whereof the present application is a division.

The object of the present improvement is to provide a simple and efficient safety gate or "shut off" for the mouth or entry of the magazine of a film reel, adapted to prevent the flame of a burning film extending into the interior of said magazine, upon the accidental firing of the picture film adjacent to the light passage of the apparatus, all as will hereinafter more fully appear.

In the accompanying drawing:—

Like reference numerals indicate like parts in both views.

Figure 1:
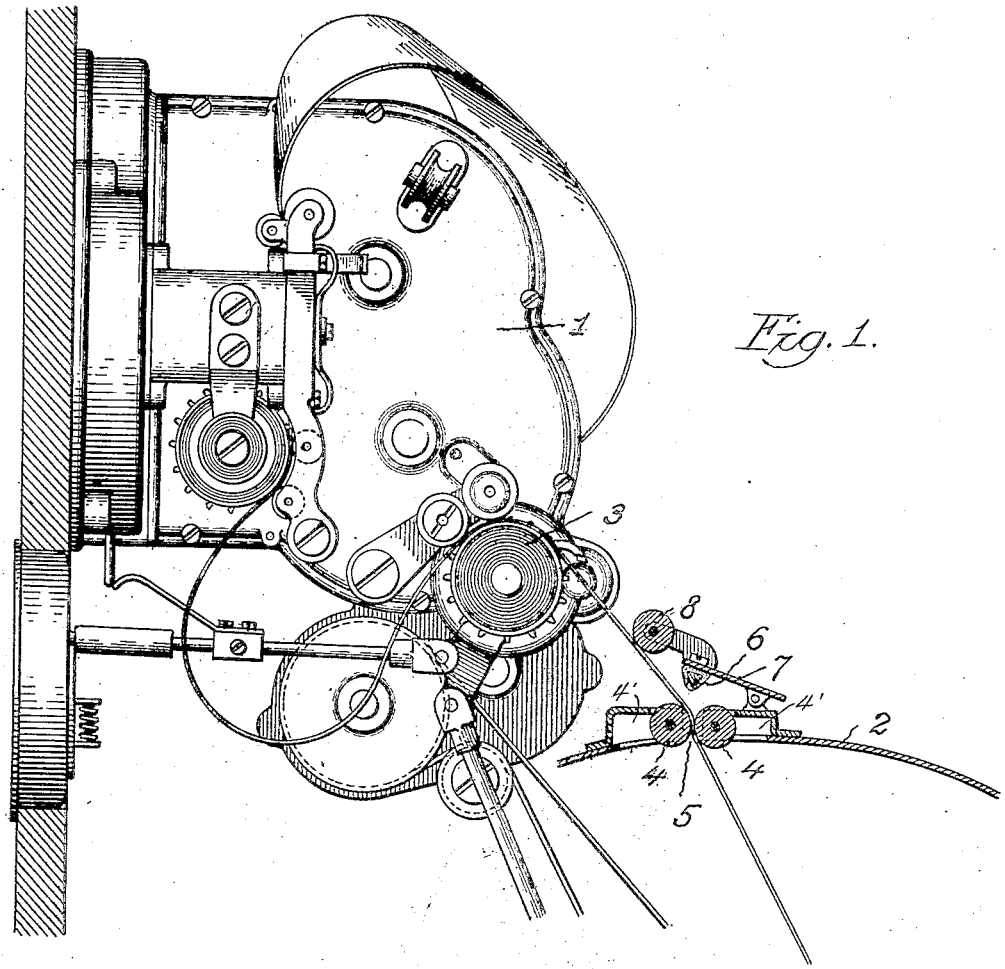
Figure 1, is a view showing the film feeding mechanism of a motion picture machine in elevation, and the associated film magazine and the present safety gate structure in section.
Figure 2:
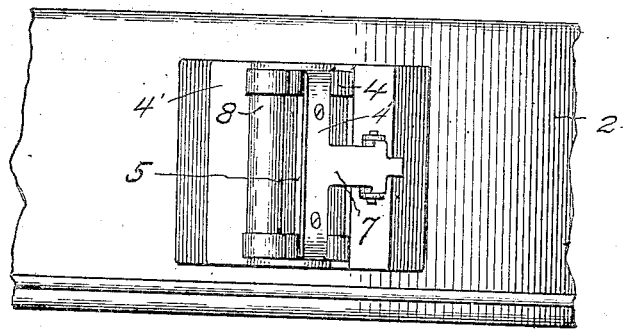
Fig. 2, is a detail top view of the safety gate structure aforesaid.

Referring to the drawing, 1 designates the supporting frame or casing for the film feeding and guiding mechanism of a motion picture machine, and 2 designates a portion of an associated magazine or casing adapted to contain a reel upon which the picture film is wound as it comes from the film feeding mechanism aforesaid, as usual in the present class of motion picture machines.

3 designates a "take up" sprocket drum associated with the film feeding mechanism, and adapted to take up and feed the film in a continuous manner to a take up reel in the magazine 2 aforesaid.

4 designates guide and friction reducing rollers associated in adjacent parallel relation to the transverse margins of an opening or gap 5 in the peripheral wall of the magazine 2 and supported in place by the housing now to be described.

4' designates a box shaped housing associated with the aforesaid peripheral opening 5 in the magazine, and provided with bearings for the pair of transverse guide rollers 4 aforesaid, to afford a substantial support to said rollers and at the same time bring said rollers into near relation to the inner face of the inner wall of the magazine so that the film will pass unimpeded from said rollers to the film reel regardless of the tangential relation of the passing portion of the film.

6 designates a swinging valve or gate head, preferably of a triangular form in cross-section, arranged in operative relation to the magazine entry orifice 5 aforesaid, and adapted to close the gap between the pair of marginal rollers 4 in the event of the picture film taking fire outside the magazine.

7 designates a carrying plate or frame for the valve or gate head 6 aforesaid, pivoted at one end to the housing 4' aforesaid and carrying said valve or gate head at its midlength as shown.

8 designates a bearing roller journaled at the free end of the plate or frame 7, and adapted to ride upon a tensioned portion of the picture film and hold said frame 7 and valve head 6 away from the guide rollers 4 in the normal operation of the associated mechanisms. With an accidental firing of said film said frame and the valve head 6 will drop by gravity and close the gap or opening between the rollers 4, as the burning of the film releases the same from the normally existing tension on the same.

Having thus fully described my said invention, what I claim as new and desire to secure by Letters Patent, is—

In a film reeling mechanism, the combination of a magazine having a peripheral gap, a box shaped housing secured to the magazine outside said gap, a pair of rollers journaled in said housing in close parallel relation to provide a narrow film orifice for the magazine, a valve carrying frame pivoted at one end to said housing and having
5 at its opposite end a bearing roller adapted to bear upon a tensioned portion of a picture film, and a valve head of an angular form in cross-section attached to said frame midway the length thereof and adapted when released to fit the space between the 10 aforesaid rollers, substantially as set forth.

Signed at Chicago, Illinois, this 1st day of February, 1918.

BRUNO STECHBART.